United States Patent [19]

Kosters

[11] Patent Number: 4,484,606
[45] Date of Patent: * Nov. 27, 1984

[54] SILO BAG FILLING MACHINE

[75] Inventor: Larry J. Kosters, Sioux Center, Iowa

[73] Assignee: Roto Press Limited, Sioux Center, Iowa

[*] Notice: The portion of the term of this patent subsequent to Nov. 1, 2000 has been disclaimed.

[21] Appl. No.: 435,631

[22] Filed: Oct. 26, 1982

Related U.S. Application Data

[63] Continuation-in-part of Ser. No. 317,497, Nov. 2, 1981, Pat. No. 4,412,567.

[51] Int. Cl.³ .............................................. B65B 3/08
[52] U.S. Cl. .................................... 141/114; 141/231; 141/256; 141/313; 198/558; 198/663; 414/526
[58] Field of Search ............... 141/100, 114, 256, 257, 141/311 R, 312, 313, 314, 315, 316, 317, 318, 377, 231–233, 391, 392, 10, 12, 67–80; 56/344, 341; 198/663, 558; 100/112, 188, 189; 414/326, 526

[56] References Cited

U.S. PATENT DOCUMENTS 4,412,567 11/1983 Kosters .............................. 141/114

Primary Examiner—Houston S. Bell, Jr.
Attorney, Agent, or Firm—Merchant, Gould, Smith, Edell, Welter & Schmidt

[57] ABSTRACT

A device for filling a bag with material is disclosed. The device includes a shroud ring adapted to hold a pleated bag and an auger device for forcing material from a hopper through a tube to a funnel and into the bag. The entire device is mobile so that the bag can be placed on a surface and the auger, hopper and funnel assembly can be moved away from the closed end of the bag as it is filled.

7 Claims, 9 Drawing Figures

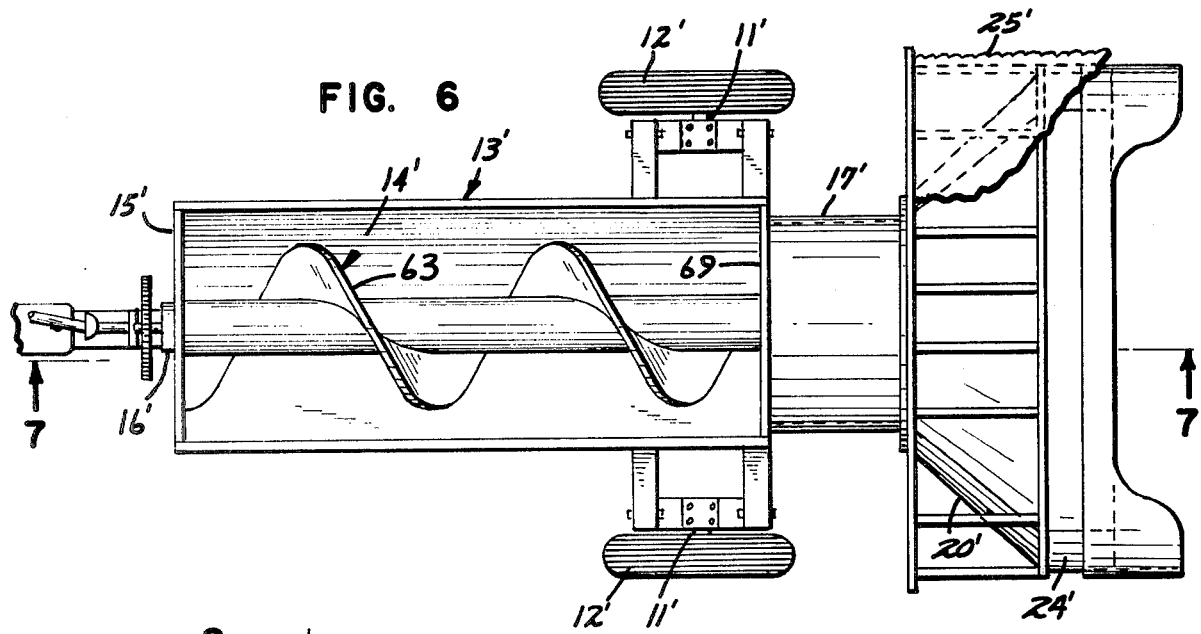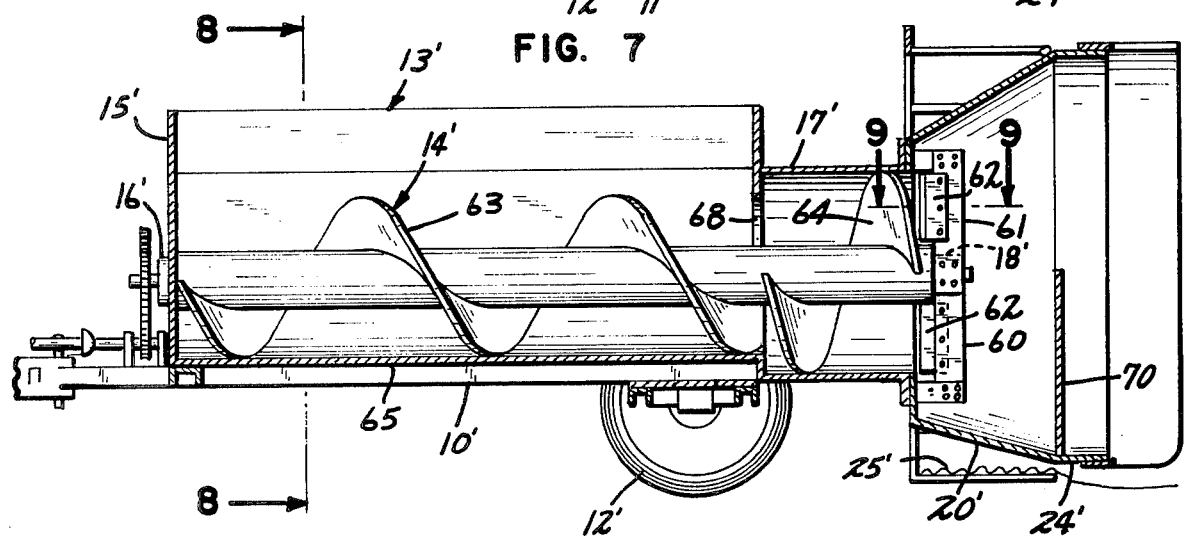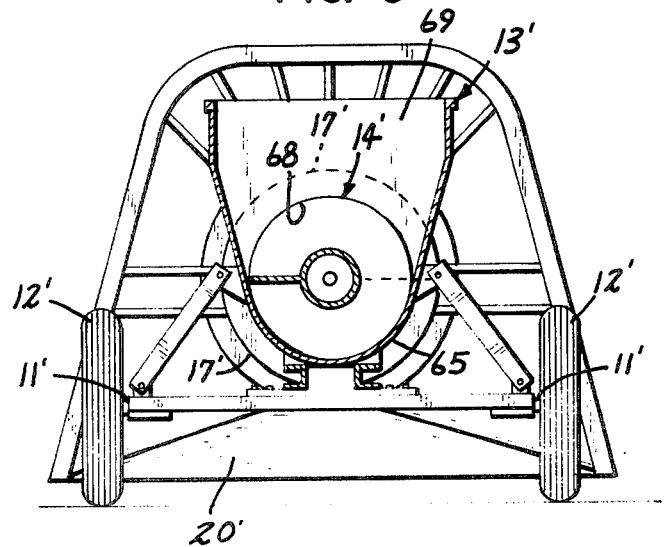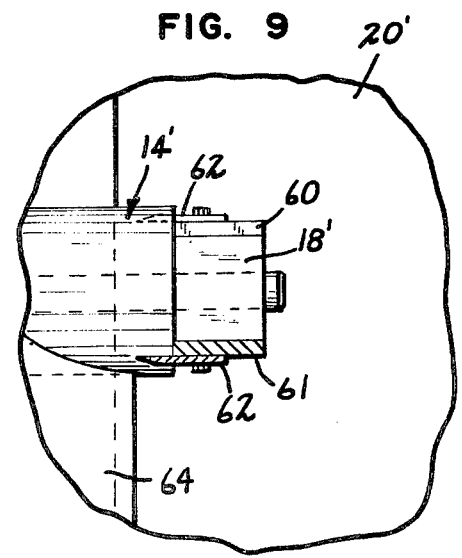

SILO BAG FILLING MACHINE

This application is a continuation in part of my pending application having Ser. No. 317,497 filed Nov. 2, 1981, now U.S. Pat. No. 4,412,567.

FIELD OF THE INVENTION

This invention pertains to devices for filling storage containers and, more particularly, to a device for filling an impervious bag with ensilage, corn, grains or other agricultural materials so that such a bag may be used as a silo or other storage facility.

BACKGROUND OF THE INVENTION

The use of vertical silos for the curing and storing of silage for livestock feed is well known. Silos have been built of wooden staves, concrete staves, tile, cement blocks and other materials for a long period of time.

Modern silos sometimes use vitreous linings in an upright silo. Other types of silage storing devices have also recently become more popularly used. Bunker silos, for example, include those formed with earthen or concrete walls bordering a broad trench. In effect, the upright silo is laid on its side. Because silage needs to cure essentially without being exposed to air, the key to the successful bunker silo is the use of an impervious plastic cover, which may also be used as a lining.

Also, the use of graineries and various bin arrangements for corn and grain is known. Occasionally, these materials are piled and covered.

SUMMARY OF THE INVENTION

Additionally, bags are known as a mechanism for storing crop materials. For example, U.S. Pat. No. 3,687,061 shows a device for conveying and pressing crop materials into a bag. Apparently, material moves from a wagon into a pressing mechanism consisting of four inclined worms which are attached for being driven at one end and are freely moveable at the other end. The worms move the material through a pressing channel into a mouthpiece by which a bag is expandably supported.

Silos and graineries have been used for many years for storing various materials. The use of bags is uncommon. The device of U.S. Pat. No. 3,687,061 is sketchily disclosed and apparently has not experienced significant success. Bag storage of materials thus awaits an apparatus capable of providing the necessary performance in moving material from a wagon or truck into the bag.

My present invention is directed to a machine for loading material into a large bag. The machine includes a housing, a forcing mechanism and a traverse mechanism for moveably supporting the housing. The housing includes a hopper, mechanism for projecting the material into the bag, and mechanism for connecting the hopper and the projecting mechanism. The forcing mechanism moves material in the hopper through the connecting mechanism to deposit it substantially centrally in the projecting mechanism. The forcing mechanism is operated by drive mechanism.

Thus, with my device, I provide for the use of a large bag formed of the same type of impervious material as the covers. This bag can best be used stretched out on the ground. The device forces the ensilage or other material into the bag and leaves the bag in place on the ground so it does not have to be moved once it is filled. I do this by providing a moving filler mechanism with a single auger which may have two different diameters and pitches and which forces material substantially centrally to a projecting device at the input of the bag, as is illustrated in the following figures and described in the specification. My device is simple and effective. It provides performance needed to move material from a wagon into a bag.

FIGURES

FIG. 6 is a top plain view of an alternate embodiment of my device,

FIG. 7 is a cross sectional view taken along line 7—7 of FIG. 6,

FIG. 8 is a cross sectional view taken along line 8—8 of FIG. 7, and

FIG. 9 is a cross sectional view taken along line 9—9 of FIG. 7.

DESCRIPTION

Briefly my invention comprises a power driven device including an auger mechanism supported by bearings at two locations along the auger adapted to force ensilage, corn, grain or other agricultural material into a large bag held on a shroud ring. As the bag is filled and lies on the surface, the filler moves, allowing the filled part of the bag to lie stationary on the ground.

More specifically and referring to FIGS. 1–5, my device includes a frame 10 mounted on an axle 11. Commonly, wheels 12 are freely journalled on the axle 11 with no drive mechanism required, thus providing a representative traverse mechanism. Alternatively, it is noted that brakes could be used in conjunction with the wheels to obtain sometimes desirable added compaction. It is also envisioned for example that skids could be used to replace the wheels.

Figure 4:
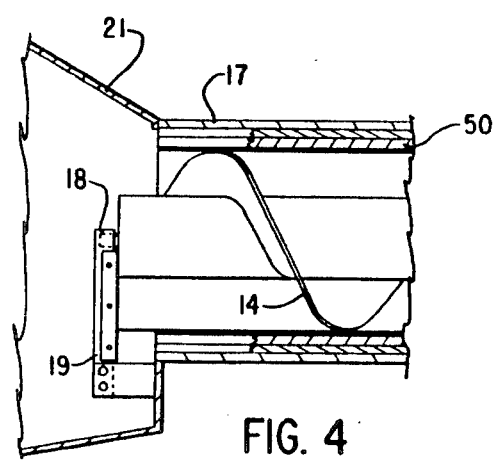
FIG. 4 is a detailed sectional view showing the end of the main auger.

A hopper 13 is mounted on the frame 10. This hopper includes a lower portion adapted to carry a principal auger mechanism 14. One end of the hopper 13 is closed by a wall 15 which carries a bearing 16 in which one end of the auger mechanism is journalled. At the other end, the hopper 13 empties into a tube 17. A bearing 18 at the outlet end of the tube is mounted on a bracket 19 on the frame 10. This bearing 18 supports the end of the auger mechanism through the outlet end of the tube. The bracket 19 is preferably formed with a sharpened edge facing the auger 14 and close enough to the end of the auger so that there is shearing action between the bracket 19 and the end of the auger (FIG. 4). It will be apparent that if desired, the auger could be supported in a bearing at the drive end and another bearing within the hopper located near the center of the auger, but the shearing action would not then be available.

The tube 17 extends a relatively short distance from the hopper 13 and empties into a funnel shaped housing 20 having a rounded top part 21 and outwardly sloping straight sides 22 and a slightly sloping bottom wall 23. A shroud ring 24 which is preferably not of circular shape, but rather takes the shape shown in the figures is carried by the housing 20, and preferably surrounds the top and the two sides. This ring 24 is adapted to receive and shape a plastic bag 25 having pleated sides surrounding the ring. The innermost pleated layer may be held to the ring by clips (not shown) or the like if necessary, but in my experience such clips will not be necessary. However, a holding frame composed of fingers 26, again taking the form of the shroud ring 24 is desirable. The lowest fingers 26' may extend away from the ring 24 so as to carry the bag on the fingers just above the ground. A tray or shelf may be used in place of fingers 26'.

Figure 1:
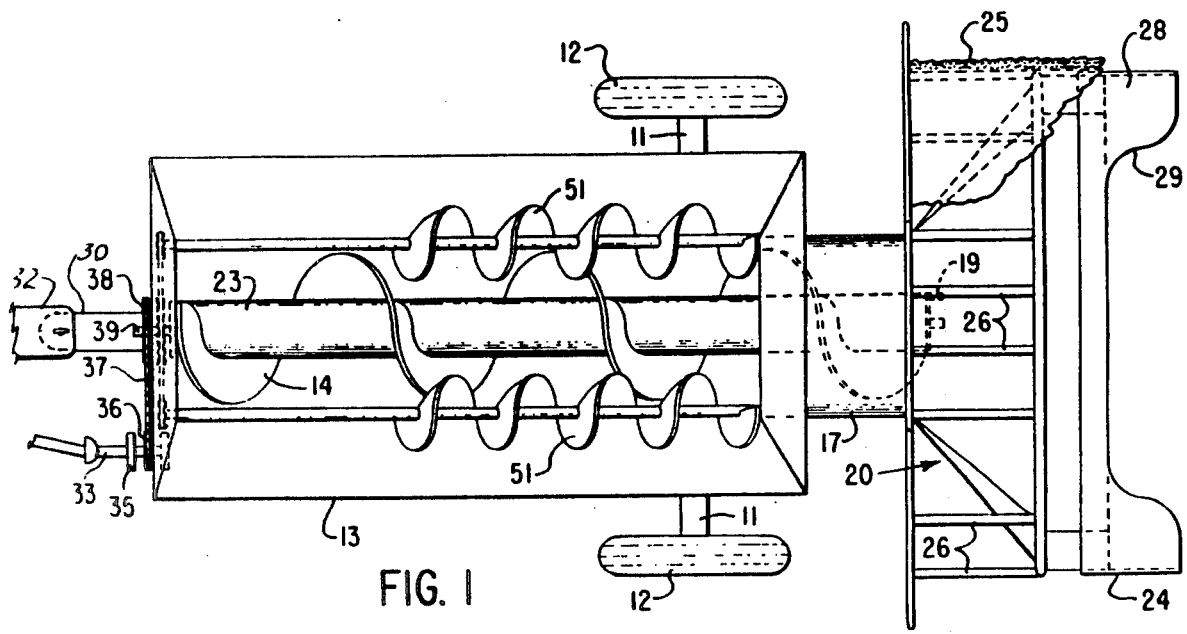
FIG. 1 is a top plan view of my device.
Figure 2:
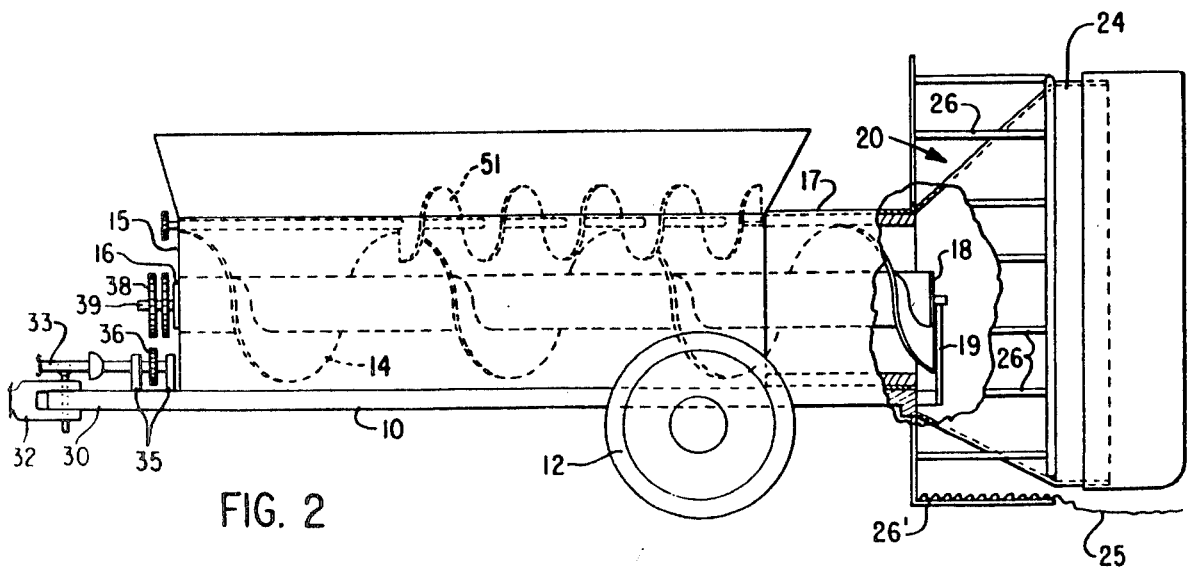
FIG. 2 is a side elevational view of my device with portions broken away to show underlying parts.
Figure 3:
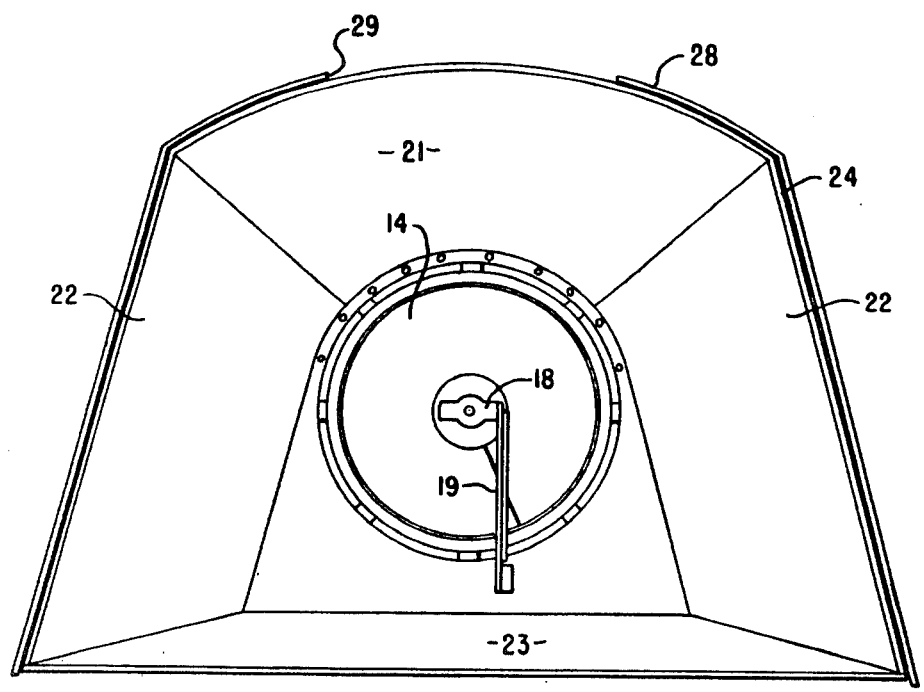
FIG. 3 is an end elevational view of the device with the bag removed.

The ring 24 is formed with a curved upper edge 28 as best shown in FIG. 1. Although compaction of ensilage is desired, an excess of compaction is not. Therefore, I provide an indented relief opening 29 by using the curved edge. Through the opening, any excess ensilage may be forced out thus relieving the pressure. It should be noted that my device will work without this feature, but I have found that the results are somewhat more satisfactory if the relief opening is provided.

Figure 5:
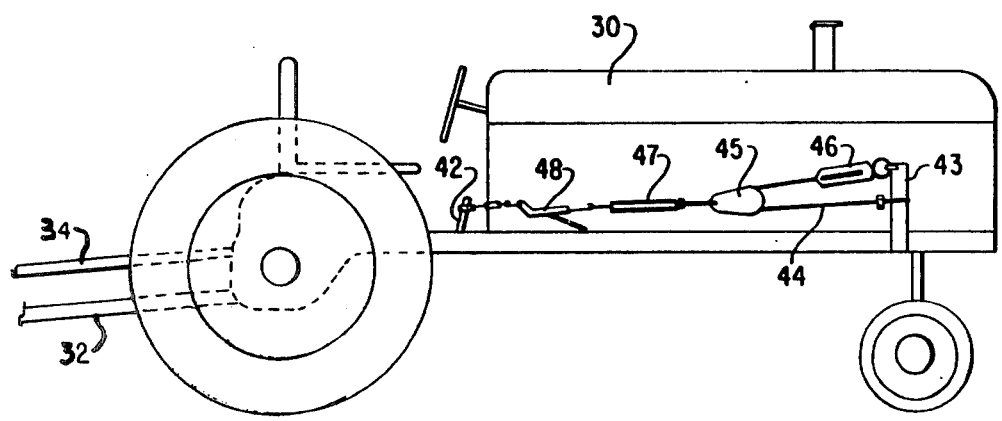
FIG. 5 is a view of the braking device as attached to a tractor.

The preferred method of operating my device requires the use of a farm tractor 30 (FIG. 5). A tongue 31 on the frame is hitched to the tractor by the usual drawbar 32. A power shaft 33 is connected to the power take-off 34 of the tractor. This shaft 33 is journalled in a pair of bearings 35 mounted on the tongue and carries a drive sprocket 36. The drive sprocket 36 acting through a chain 37 drives sprocket 38 mounted on the auger shaft 39. Thus the device can be both pulled and powered by the tractor.

In use, I prefer to place the machine initially with the bag carrying ring 24 near a wall of some type so that the bag as it fills will be backed up by a solid barrier. The tractor is started and ensilage is dumped into the hopper 13. The auger 14 picks up the material and forces it into the tube 17 and out through the housing 20 towards the end of the bag adjacent the ring 24.

As the material is forced into the bag, the pressure within the shroud ring 24 builds. This tends to force the entire tractor-filler combination away from the wall against which the bag is supported. Movement of the combination may be resisted by proper application of tractor brakes to achieve the compaction desired.

One mode of use of the tractor brakes is illustrated in FIG. 5. As shown in that figure, the tractor 20 is provided with a brake pedal 42. This pedal is arranged so that movement towards the front of the tractor imposes pressure on the tractor brakes. A bracket 43 is provided on the frame of the tractor between which and the brake pedal I provide for adjustable means by which to apply a measured amount of force to the pedal so that the proper resistance to motion can be used.

The means shown is the preferred means, but it will be apparent that a pushing device could be used or that parts of the illustrated device could be omitted or changed while remaining within the scope of the invention. As illustrated, however, the device consists of a cable 44 passing from the bracket 43 around a pulley 45 and then back to the bracket. A scale 46 may be inserted between the cable and the bracket so that tension can be measured in order to duplicate the amount of pressure on the brakes. A turnbuckle 47 and a stretching device 48 are also included in the connection. The turnbuckle 47 makes possible suitable adjustment so that pressure on the brake can be varied, and the stretcher 48 makes possible a quick and easy application and release of brake pressure.

Thus, as the bag 25 fills, pushing the device including the tractor away from the filling bag, the pleats of the bag become unfolded and gradually pay off the fingers 26 providing added bag space to be filled. The whole process continues until the bag is completely filled and sealed to provide the full horizontal silo.

During the process, the knife edge on the support 19 interacts with the end of the auger 14 to provide a shearing of the material and thus conserve the power necessary to push the material out of the anger 14 into the chute 17. This shearing action is particularly applicable with hay to avoid binding of the material between the flighting and the bearing support. Also, excess compaction can be relieved by the action of the relief opening 29 provided by the upper edge 28.

In order to be able to load a variety of types of ensilage and grains for storage in bags, an alternative may be necessary. This alternative requires only slight changes best shown in FIG. 4. Grain, or ensilage composed largely of grain, requires that the auger 14 fit closely within the tube 17. On the other hand, I have discovered that ensilage composed largely of hay-like material will jam up such an auger. Therefore, I provide for a tube 17 having an inner diameter somewhat larger than the auger 14 to allow for considerable clearance between the auger and tube. This works well with haylage. In order to use the device with grain enriched ensilage I provide an insertable inner liner 50 with outer diameter for a fairly close fit inside the tube 17 and an inner diameter for relatively closer fit with the auger 14. If desired, multiple lining tubes 50 may be used to provide the necessary fits. Thus, I provide a device usable for various types of materials to be used to fill the bag.

I also provide means adapted to enhance movement of the material within the hopper 13. Some types of material tend to move toward the end of the hopper nearest the tube 17 and then either overflow that end, or bridge over. To avoid that situation, I provide auxiliary augers 51. These are driven from the sprocket 37 through a conventional chain drive. However, the flighting on the auger 51 should be of the opposite "hand", or should be driven to rotate in a direction opposite from that of the main auger 14. Thus, the material influenced by these augers 51 tends to move away from the tube 17. Augers 51 are especially useful when hopper 13 is rapidly filled with a front end loader.

Referring now to the embodiment of FIGS. 6-9, parts similar to those described in FIGS. 1-5 are given identical numbers but are primed to show usage on the alternate embodiment. Other parts are given new numbers.

As in the earlier embodiment, a frame 10' is mounted on an axle 11' with wheels 12' freely journalled thereon. Frame 10' supports a hopper 13'. One end of hopper 13' is closed by a wall 15' carrying a bearing 16' in which one end of auger mechanism 14' is journalled. At its other end, hopper 13' empties into a tube 17'. A bearing 18' at the outlet end of tube 17' is mounted with a pair of brackets 60, 61. Bracket 60 is similar to bracket 19 of the earlier embodiment. Bracket 61 is also similar except it is mounted to funnel housing 20' at the upper end of tube 17'. Both brackets 60, 61 have attached plates 62 with sharpened edges to provide a shearing action of the agricultural material impacting thereagainst as described hereinbefore.

Auger 14' includes a hopper portion 63 and a tube portion 64. Hopper portion 63 of auger mechanism 14' has a smaller diameter and longer pitch than the tube portion 64 of auger mechanism 14'. Although various shapes of augers was contemplated with respect to the embodiment of FIGS. 1-5, I have found as an example the alternate embodiment of FIGS. 6-9 wherein an auger mechanism 14' having two different diameters provides improved performance in some cases over auger mechanism 14 having a single overall diameter. Although an auger mechanism with two diameters and the same pitch for both diameters is usable, I find that when the larger diameter of tube portion 64 of the auger mechanism 14' has a pitch somewhat reduced from the hopper portion 63 of the auger mechanism 14", that forcing performance for a number of materials improves. In particular, the lesser pitch has greater pressing ability. It is not necessarily the case, however, that there is a specific pitch and diameter relationship for the two different portions for a particular rotated speed of the auger mechanism. Although when an auger mechanism with two diameters such as presently described is used, it is advantageous to have a somewhat reduced pitch for the larger diameter portion compared to the smaller diameter portion. Thus, the material to be stored is moved at a first rate through hopper 13' and a second rate through tube 14' and the funnel housing 20' to bag 25'.

With respect to hopper 13', the lower portion 65 is formed to be in close proximity to rotating auger mechanism 14'. The lower portion 65 has a semi-cylindrical shape with walls 66 extending diagonally and tangentially from lower portion 65 to upper vertically rising walls 67. The close relationship of the auger 14' to the lower portion 65 of hopper 13' is benefical for moving shell corn and grains, as well as hay. It is noted that the opening 68 in end wall 69 opposite end wall 15' of hopper 13' is circular of only slightly larger diameter than the diameter of hopper portion 63 of auger mechanism 14'. For the present embodiment, it is generally benefical to maintain a close relationship of the auger to all nearby walls. Thus, tube 17' also has an inside diameter only slightly larger than the diameter of tube portion 64 of auger mechanism 14'.

The embodiment of FIGS. 1-5 is very useful for moving ensilage. The single diameter auger 14 when used without a liner 50 allows the device to move hay or haylage. The present embodiment of FIGS. 6-9 with an auger having two diameters and pitches with closely adjacent walls of hopper 13' and 17' moves all materials very efficiently.

Although it is desired to compress ensilage, it is somewhat undesirable to compress shelled corn and grains. To prevent the pressing and compacting of a particular agricultural material, a baffle 70 may be welded or otherwise attached to shroud ring 24'. Baffle 70 extends across the entire width of shroud ring 24' and extends upwardly to approximately the centerline of auger mechanism 14'. Especialy for shell corn and grains, agricultural material moves against baffle 70 and then flows over it into bag 25'. The agricultural material, however, does not compress, but rather flows from the output end of tube 17' through funnel housing 20' over baffle 70 into bag 25'. Baffle 70 thus provides an advantageous high level of fill to bag 25'.

To use the embodiment of FIGS. 6-9, a drive mechanism such as that exemplarily described earlier is energized so auger mechanism 14' begins to rotate. Agricultural material is continuously conveyed or otherwise moved into hopper 13'. A close relationship between the hopper portion 63 of auger mechanism 14' and the lower portion 65 of hopper 13' allows augar mechanism 14' to efficiently move the material to opening 68. As the material enters tube 17', it expands into the larger diameter and moves generally somewhat more slowly depending on the pitch. The larger diameter of tube 17' and of the tube portion 64 of auger mechanism 14' reduces the likelihood of compaction of the agricultural material within tube 17'. Due to the close relationship between tube 17' and the tube protion 64 of auger mechanism 14', however, the material is moved efficiently to funnel housing 20'. Any material contacting brackets 60, 61 is sheared by the knife edges of plates 62. If a baffle 70 is present in the particular machine, material fills in between baffle 70 and auger mechanism 14', but thereafter flows at a relatively high level over baffle 70 into bag 25', thereby avoiding compaction due to auger mechanism 14' stuffing directly against material filling bag 25'.

In these ways, the present invention has been described given characteristics and advantages, together with detailed of structure and function. Regardless of the embodiments described, however, it is to be understood that the present disclosure is illustrative only. Therefore, it is fully contemplated that changes made, especially in matters of shape, size and arrangement, to the full extent extended by the general meaning of the terms in which the appended claims are expressed, are within the principle of my invention.

What is claimed is:

1. A machine for loading material into a storage bag, said machine comprising:
    a hopper for receiving said material from a source, said hopper having an output opening, said hopper having operably attached therein first means for moving at a first rate said material in said hopper to the output opening;
    means for directing said material from said hopper to said bag, said directing means including second means for moving said material at a second rate, said directing means including means for holding said bag; and
    traverse means for movably supporting said hopper and said directing means;
    whereby said material is moved from said hopper to said bag, said machine moving on said traverse means as said bag fills.

2. A machine in accordance with claim 1 wherein said first moving means includes a first auger having flights with a first diameter and a first pitch and wherein said second moving means includes a second auger having flights with a second diameter and a second pitch.

3. A machine in accordance with claim 2 including means for attaching said first and second augers together.

4. A machine in accordance with claim 3 wherein said hopper includes a semi-cylindrical bottom having a third diameter slightly larger than the first diameter of said first auger, whereby said first auger and said bottom are in relatively close proximity to one another.

5. A machine for loading agricultural material into a storage bag, said machine comprising:
    a hopper for receiving material from a source;
    a funnel including means for holding said bag thereto;
    a tube connecting said hopper and said funnel, said tube having a second inside diameter;
    an auger having portions with first and second diameters and first and second pitches, respectively, the first diameter of said auger being slightly smaller than the first diameter of said hopper bottom, the second diameter of said auger being smaller than the second diameter of said tube, the first diameter being less than the second diameter, the first pitch being greater than the second pitch, whereby the greater diameter and lesser pitch of the auger portion in said tube alleviates compacting;

means for rotatably driving said auger; and traverse means for moveably supporting said machine.

6. A machine in accordance with claim 5 wherein said auger attaching means includes a pair of bearing mounts at a discharge end of said auger, said mounts being formed with a knife edge facing said discharge end to cut said material coming through said tube from said hopper.

7. A machine in accordance with claim 5 including a baffle attached traverse to said auger to the lower portion of said funnel, said baffle preventing substantial compacting of said material in said bag and giving a higher level of fill.

* * * * *